Figure 1:
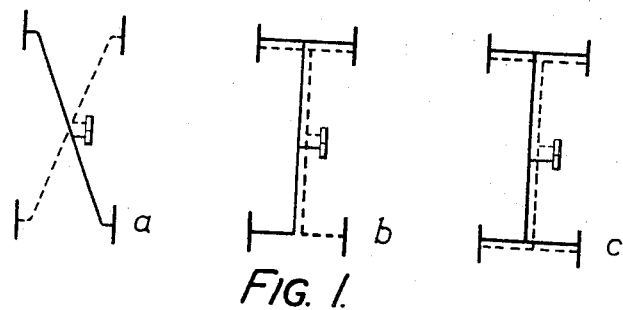

United States Patent
Schroder et al.

[11] 3,843,213
[45] Oct. 22, 1974

[54] VEHICLE BRAKING SYSTEM
[75] Inventors: Dieter Schroder, Bassenheim;
Wolfgang Hess, Rubenack, both of Germany
[73] Assignee: Girling Limited, Birmingham, England
[22] Filed: Jan. 16, 1973
[21] Appl. No.: 324,167

[30] Foreign Application Priority Data
Jan. 18, 1972  Germany.................................. 4239

[52] U.S. Cl................. 303/22 R, 188/195, 303/6 C
[51] Int. Cl............................................... B60t 8/18
[58] Field of Search.... 303/22 R, 22 A, 23 R, 23 A, 303/6 C, 6 R; 188/195, 349

[56] References Cited
UNITED STATES PATENTS
| | | | |
|---|---|---|---|
| 3,325,224 | 6/1967 | Brueder | 303/22 R |
| 3,415,576 | 12/1968 | Henry-Biaband | 303/22 R |
| 3,702,207 | 11/1972 | Armstrong | 303/22 A |

*Primary Examiner*—Trygve M. Blix
*Assistant Examiner*—D. C. Butler
*Attorney, Agent, or Firm*—Scrivener Parker Scrivener & Clarke

[57] ABSTRACT

A dual hydraulic vehicle braking system having two separate pressure circuits comprises a pair of load-conscious braking-pressure regulating valves respectively connected to the separate circuits, a transmission linkage mechanically connecting the valves, and an arrangement for sensing vehicle loading and for applying a force to the transmission linkage in dependence upon the sensed vehicle loading. The transmission linkage transmits the force to the valves, the force being divided between the valves when both circuits are operative and being transmitted wholly to only one of the valves if the circuit connected to the other valve fails.

5 Claims, 5 Drawing Figures

VEHICLE BRAKING SYSTEM

This invention relates to vehicle dual hydraulic braking systems having two separate pressure circuits and commonly referred to as "split" systems.

In such systems, particularly diagonally split, L-split and horizontally split systems, only one half of the system remains operative if one of the circuits of the system fails. If such a failure occurs the braking pressure for the operative circuit has to be increased to twice the braking pressure for a fully operative system to obtain the same braking effect.

A load-conscious braking-pressure regulating valve is normally provided in such systems for each rear wheel or each rear axle branch of the vehicle for each of the circuits. Each valve has a cut-in pressure which is dependent upon the load on the rear axle, but in known arrangements if one circuit of the system fails, the cut-in pressure of the valve associated with the remaining circuit does not increase to a corresponding degree, with the result that the braking efficiency is decreased. It is desirable to provide a system whereby when one circuit fails the pressure regulating valve associated with the other circuit has, for a given axle load, a cut-in pressure of substantially double that of each valve when both circuits are operative.

Thus, the invention provides a dual hydraulic vehicle braking system having two separate pressure circuits comprising a pair of load-conscious braking pressure regulating valves respectively connected to the separate circuits, a transmission linkage mechanically connecting the regulating valves, and means for applying a force to the transmission linkage in dependence upon the vehicle loading, the transmission linkage transmitting the force to the valves, wherein the force transmitted by the linkage is divided between the valves when both circuits are operative and is transmitted substantially wholly to one valve when the circuit connected to the other valve fails.

Figure 2:
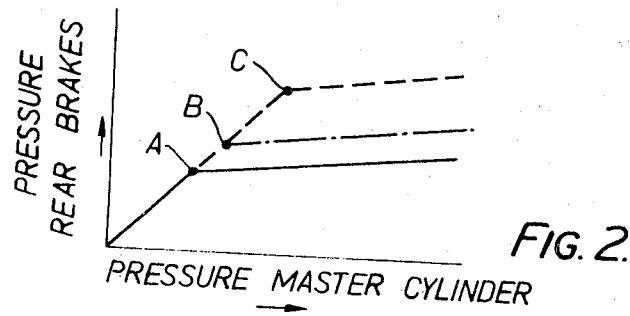
Figure 3:
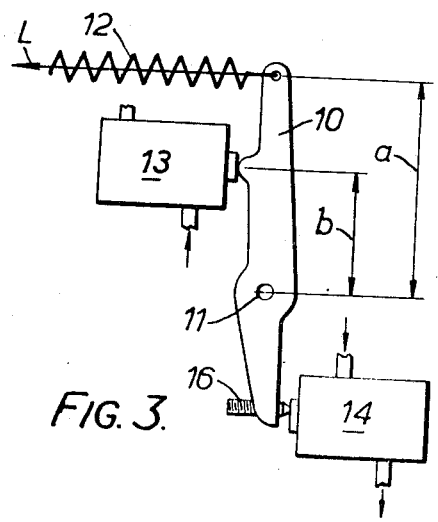
Figure 4:
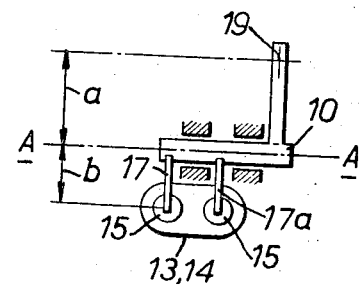
Figure 5:
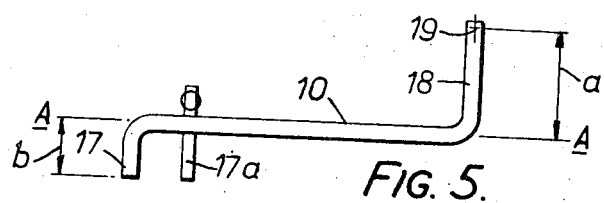

The invention will now be described, by way of example, with reference to the accompanying drawings, in which:

FIGS. 1a,b and c illustrate respectively three dual braking systems embodying the invention, FIG. 2 is a pressure distribution curve, FIG. 3 is a diagrammatic view of a load-conscious pressure regulating valve arrangement in accordance with the invention, and FIGS. 4 and 5 are diagrammatic views of another load-conscious pressure regulating valve arrangement in accordance with the invention and a transmission linkage, respectively.

FIGS. 1a, b and c show respectively a diagonally split dual hydraulic braking system in which each circuit connects diagonally opposite wheel brakes, an L-split system in which each circuit connects the two front wheel brakes with a different rear wheel brake, and a horizontally split system in which each circuit connects different elements, for example a chamber in a wheel cylinder, on all four wheels.

FIG. 2 is a pressure distribution curve showing a cut-in point A for a known pressure regulating valve if the whole braking system is operative. To obtain the same braking efficiency when one circuit of the system fails as when the whole system is operative, for a given axle load, the cut-in point for the operative pressure regulating valve should be at C, which is at double the pressure of the point A. With known pressure regulating valves, if one of the circuits fails movement of a compensating lever, which movement is dependent upon the loading of the rear axle of the vehicle, is resisted by one half of the force of a control spring in the regulating valve associated with the circuit which has failed. Thus, because of the reduced deceleration, the rear axle will be relieved of its load at a higher pressure, since the control spring of the regulating valve in the operative circuit absorbs part of the transmitted force of the compensating lever. Thus the cut-in point of the operative regulating valve will be at B, which means that there will be a loss in braking efficiency as compared with a fully operative system. To obtain the optimum braking effect in such a case, the pressure regulating valve has to be by-passed by a further valve which allows the full braking pressure to be supplied from the master cylinder, with the result that the pressure might be so high that the rear wheels lock.

In the arrangements of FIGS. 3,4 and 5 two parallel load-conscious braking pressure regulating valves are acted upon by a transmission member movement of which is dependent upon the load on the rear axle. In each embodiment, the force transmitted by the transmission member is divided equally between the two regulating valves, when the system is fully operative, without the interposition of any resilient means. If one of the circuits fails, the regulator valve of the failed circuit will not apply any resisting force to the transmission member because the pressure in the failed circuit has been reduced to zero and the regulator valve of the other circuit will have a force applied to it of double the normal value.

Referring to FIG. 3, the transmission member 10 is pivotable about a point 11 and is subjected to a force dependent upon rear axle loading L through a resilient member 12. Two pressure regulating valves 13 and 14 associated with separate splits of the system are spaced equidistantly from the pivot point 11 on opposite sides thereof and no opposite sides of the transmission member 10.

If $a$ = the distance of the resilient member from the pivot point $b$ = the distance of the regulating valves from the pivot point $F1$ = area of the piston in each valve $L$ = force applied to the transmission member, then the cut-in pressure $P_A$ of the valves when both the circuits are operative is $P_A = La/2bF_1$. If one circuit fails, then the cut-in pressure $Pc$ of the valve of the remaining circuit is given by $$Pc = La/bF_1 = 2P_A$$

The foregoing assumes that there is no play between the transmission member 10 and the tappets 15 of the valves 13 and 14. In order to ensure that there is no play, an adjusting screw 16 is connected to the transmission member to abut the tappet of the valve 14.

Thus, if one circuit fails, the movement of the transmission member is not resisted by the valve in the failed circuit and, according to the above formula, the valve of the operative circuit will not close until a pressure of double that required when the system is fully operative is reached.

The arrangement of FIGS. 4 and 5 is similar to that of FIG. 3 and the same reference numerals have been used to denote corresponding parts. The above formula also apply. In this arrangement the transmission member 10 is in the form of a torsion bar rotatable about an axis A—A having levers 17 which abut the tappets 15 of regulating valves 13 and 14. The valves are arranged in parallel in a single housing. In order to prevent lost motion between the torsion bar 10 and the tappets 15, at least one of the levers 17a is adjustable relative to the torsion bar.

The rear axle load is applied to a laterally extending arm 18 of the torsion bar 10 in a direction perpendicular to the plane of the drawing at a point 19 a distance $a$ from the pivot axis A-A, and the distance of the regulating valves from the axis is $b$.

We claim:

1. A dual hydraulic vehicle braking system having two separate pressure circuits, comprising a pair of load-conscious braking pressure regulating valves respectively connected to said separate circuits, a transmission linkage having a mechanical connection with both of said regulating valves, and means for sensing vehicle loading and for applying a force to the transmission linkage at a fixed point thereon in dependence upon said vehicle loading, said transmission linkage transmitting said force to the valves, wherein said linkage is operative to divide said force between said valves when both circuits are operative and to transmit substantially the whole of said force to one of said valves in response to failure of said circuits connected to the other of said valves.

2. A braking system according to claim 1, wherein said transmission linkage comprises a lever arranged to pivot about a pivot axis, and wherein said valves are arranged adjacent said lever, one on each side of said lever and one on each side of the said pivot axis equidistantly spaced from said pivot axis.

3. A braking system according to claim 2, comprising adjusting means for eliminating lost motion between said lever and said valves.

4. A braking system according to claim 1, wherein said transmission linkage comprises a torsion bar, a pair of spaced levers of equal length carried by said torsion bar and extending laterally of said bar and engaging respective valves, and an arm extending laterally of said bar to which said force is applied, said torsion bar transmitting the resultant couple to said valves through said levers.

5. A braking system according to claim 4, wherein at least one of said levers is adjustable to eliminate lost motion between said levers and said valves.

* * * * *